US009081734B2

(12) United States Patent
Soderlund et al.

(10) Patent No.: US 9,081,734 B2
(45) Date of Patent: Jul. 14, 2015

(54) RESTORING FROM A LEGACY OS ENVIRONMENT TO A UEFI PRE-BOOT ENVIRONMENT

(71) Applicant: INTERNATIONAL BUSINESS MACHINES CORPORATION, Armonk, NY (US)

(72) Inventors: Adam L. Soderlund, Bahama, NC (US); Wen Wei Tang, Shanghai (CN); Song Qing Wu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 13/863,523

(22) Filed: Apr. 16, 2013

(65) Prior Publication Data
US 2013/0290778 A1 Oct. 31, 2013

(30) Foreign Application Priority Data

Apr. 28, 2012 (CN) .......................... 2012 1 0132893

(51) Int. Cl.
*G06F 11/00* (2006.01)
*G06F 11/14* (2006.01)
(52) U.S. Cl.
CPC ........ *G06F 11/1471* (2013.01); *G06F 11/1417* (2013.01); *G06F 11/1438* (2013.01)
(58) Field of Classification Search
CPC .......................... G06F 11/1471; G06F 11/1438
See application file for complete search history.

(56) References Cited

U.S. PATENT DOCUMENTS

| 6,961,848 | B2* | 11/2005 | Fish et al. ......................... 713/2 |
| 7,146,512 | B2 | 12/2006 | Rothman et al. |
| 7,363,536 | B1* | 4/2008 | Gardner et al. ................. 714/15 |
| 7,454,547 | B1 | 11/2008 | Nallagatla et al. |
| 7,607,041 | B2* | 10/2009 | Kraemer et al. ................ 714/15 |
| 8,499,142 | B1* | 7/2013 | Ramamurthy et al. ........... 713/2 |
| 2002/0083367 | A1* | 6/2002 | McBride et al. ................ 714/15 |
| 2003/0074601 | A1* | 4/2003 | Schultz et al. .................. 714/15 |

(Continued)

FOREIGN PATENT DOCUMENTS

| EP | 2 393 008 A2 | 7/2011 |
| WO | WO 2009/032445 A1 | 3/2009 |
| WO | WO 2010/138788 A1 | 12/2010 |

OTHER PUBLICATIONS

PCT International Search Report and Written Opinion, PCT/CN2013/074127, Jul. 18, 2013, International Business Machines Corporation et al., pp. 1-10.

*Primary Examiner* — Amine Riad
(74) *Attorney, Agent, or Firm* — Edward J. Lenart; James R. Nock; Kennedy Lenart Spraggins LLP

(57) ABSTRACT

Restoring from a legacy OS environment to a Unified Extensible Firmware Interface (UEFI) pre-boot environment, including: storing, under the UEFI pre-boot environment, context in the UEFI pre-boot environment that needs to be preserved, where the context in the UEFI pre-boot environment that needs to be preserved includes CPU execution context; restoring a first portion of the CPU execution context in response to the UEFI pre-boot environment failing to load the legacy OS; making a CPU associated with the UEFI pre-boot environment enter into System Management Mode, and restoring a second portion of the CPU execution context under the System Management Mode; and exiting from CPU System Management Mode, thereby returning to the UEFI pre-boot environment.

20 Claims, 5 Drawing Sheets

(56) References Cited

U.S. PATENT DOCUMENTS

| | | |
|---|---|---|
| 2004/0255106 A1* | 12/2004 | Rothman et al. ............ 713/1 |
| 2007/0061634 A1 | 3/2007 | Marisetty et al. |
| 2009/0172471 A1* | 7/2009 | Zimmer et al. ............ 714/17 |
| 2009/0327684 A1* | 12/2009 | Zimmer et al. ............ 713/2 |
| 2009/0328195 A1 | 12/2009 | Smith |
| 2010/0017796 A1 | 1/2010 | Walker et al. |
| 2010/0169633 A1 | 7/2010 | Zimmer et al. |
| 2013/0124843 A1* | 5/2013 | Bobzin ............ 713/2 |
| 2014/0032962 A1* | 1/2014 | Deshpande ............ 714/15 |
| 2014/0325197 A1* | 10/2014 | Lewis et al. ............ 713/2 |

* cited by examiner

RESTORING FROM A LEGACY OS ENVIRONMENT TO A UEFI PRE-BOOT ENVIRONMENT

CLAIM OF PRIORITY

This application claims priority under 35 U.S.C §119 to Chinese Patent Application No. 201210132893.6 filed Apr. 28, 2012, the entire text of which is specifically incorporated by reference herein.

BACKGROUND OF THE INVENTION

1. Field of the Invention

The field of the invention is data processing, or, more specifically, methods, apparatus, and products for restoring from a legacy OS environment to a UEFI pre-boot environment.

2. Description Of Related Art

Legacy BIOS (Basic Input/Output System) is a kind of firmware, as a basic input/output system, it is responsible for such work as hardware boot and detection when powering up, and acts as an intermediate role while OS controls hardware. Since Windows NT, Linux, these OS have put hardware control programs need to be performed by BIOS in the past into OS, the programs are performed in OS and there is no longer any need to invoke BIOS functionality. Due to rapid development of hardware, legacy BIOS has become a burden in the development.

Nowadays, a newest Extensible Firmware Interface (EFI) has been developed. Unified Extensible firmware Interface (UEFI) is developed based on EFI1.10, and UEFI is a standard that describes a fully new type of interface. Such interface is used by OS for automatically loading from a pre-boot operation environment onto one type of OS, thereby simplifying power up procedure and saving time.

UEFI uses a parameter stack transfer approach in C language style and a dynamic link manner to construct system, it is easier to be implemented than BIOS, better in fault tolerance and error correction, and may shorten the time in system research and development. Furthermore, UEFI operates in 32-bit or 64-bit modes, larger addressing capability could provide better performance in comparing with BIOS. Moreover, driver of UEFI architecture is written in EFI byte code, which is a set of virtual machine instructions for UEFI driver, the instructions are interpreted to run in UEFI driven operation environment and may ensure sufficient downward compatibility of UEFI. In addition, graphic driver function is built in UEFI, which may provide a color graphic environment with high resolution. After entering into the environment, user can adjust configurations by clicking with a mouse, which is as simple as application software in Windows system. Further, UEFI employs modular design, and is logically divided into two parts: hardware control and OS software management, wherein hardware control is common to all UEFI versions, and OS software management is actually a programmable open interface by which main board manufacturers may realize various rich functions. For example, various backup and diagnostic functions well known to those skilled in the art may be realized through UEFI. Therefore, many computer manufacturers have currently begun to use UEFI firmware, and it is expected that sale of UEFI firmware supported machines will be in dominant position.

From the perspective of UEFI firmware, OS may be divided into two types: the first type of OS is one that can support and utilize UEFI firmware, such as Windows Server 2008 R2; the second type of OS is one that can not support UEFI firmware, i.e. legacy OS. UEFI may provide a compatibility support module, which enables UEFI firmware to load and boot a legacy OS, such as Windows XP 32-bit edition, Windows Server 2003 for x86 etc.

The running environment of UEFI firmware is UEFI pre-boot environment, this environment executes UEFI firmware code and prepares system boot stages of boot environment for OS. When the system load module of UEFI firmware loads an OS supporting and utilizing UEFI, the system load module may directly return to UEFI pre-boot environment if the OS can not be successfully loaded due to any problem. When the system load module of UEFI firmware loads and boots a legacy OS, however, a compatibility support module is needed in the system load module, or, a compatibility support module is directly utilized without the system load module, so as to make it possible to load and boot the legacy OS. However, in prior art, once UEFI enters into Compatibility Support Module to perform boot attempt on legacy OS, there is no way to return to UEFI pre-boot environment even if boot attempt of the legacy OS fails. As such, engineers can not conduct problem diagnosis.

SUMMARY OF THE INVENTION

According to an aspect of the present invention, there is provided a method for restoring from legacy OS environment to Unified Extensible Firmware Interface (UEFI) pre-boot environment, comprising: storing, under the UEFI pre-boot environment, context in the UEFI pre-boot environment that needs to be preserved, the context in the UEFI pre-boot environment that needs to be preserved comprises CPU execution context; restoring a first portion of the CPU execution context in response to the UEFI pre-boot environment fails to load legacy OS; making CPU associated with the UEFI pre-boot environment enter into System Management Mode, and restoring a second portion of the CPU execution context under the System Management Mode; and exiting from CPU System Management Mode, thereby returning to the UEFI pre-boot environment.

According to another aspect of the present invention, there is provided a system for restoring from legacy OS environment to Unified Extensible Firmware Interface (UEFI) pre-boot environment, comprising: a storing means configured to store, under the UEFI pre-boot environment, context in the UEFI pre-boot environment that needs to be preserved, the context in the UEFI pre-boot environment that needs to be preserved comprises CPU execution context; a first restoring means configured to restore a first portion of the CPU execution context in response to the UEFI pre-boot environment fails to load legacy OS; a second restoring means configured to make CPU associated with the UEFI pre-boot environment enter into System Management Mode, and restore a second portion of the CPU execution context under the System Management Mode; and an exiting means configured to exit from CPU System Management Mode, thereby returning to the UEFI pre-boot environment.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
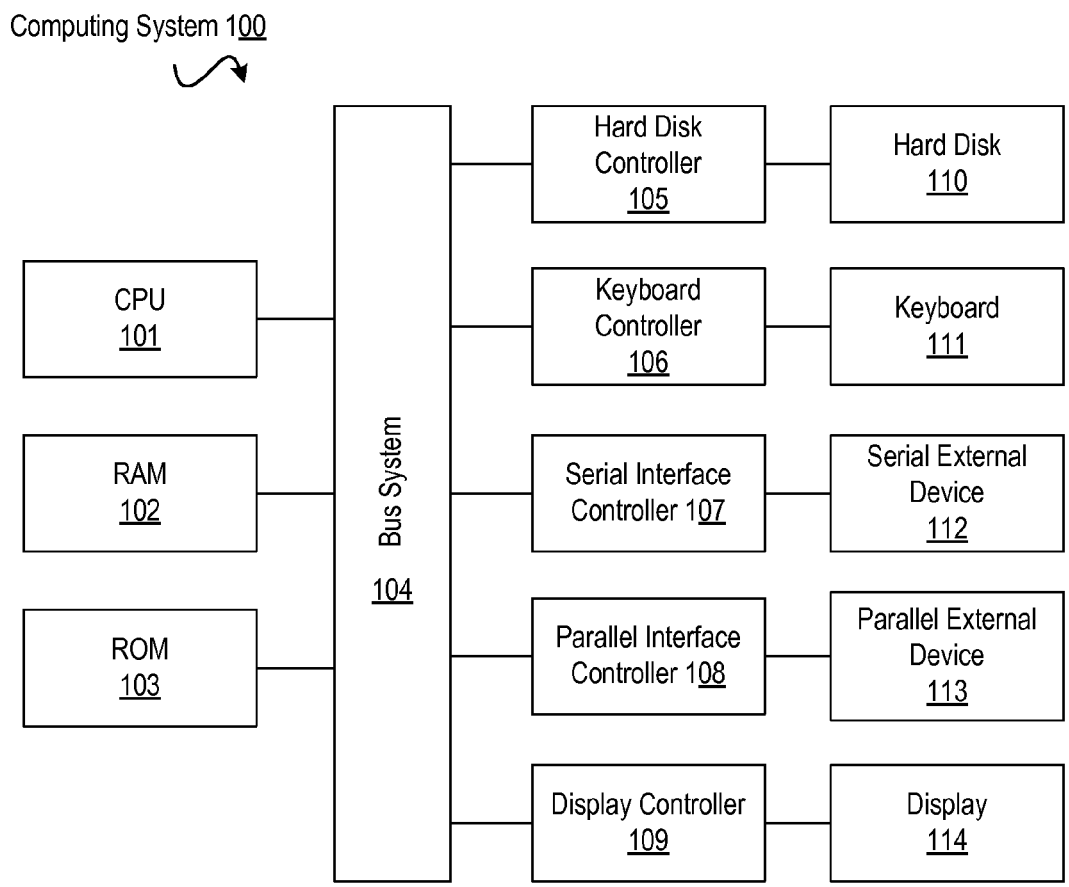
FIG. 1 shows an exemplary computer system 100 which is applicable to implement the embodiments of the present invention.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local region network (LAN) or a wide region network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 2:
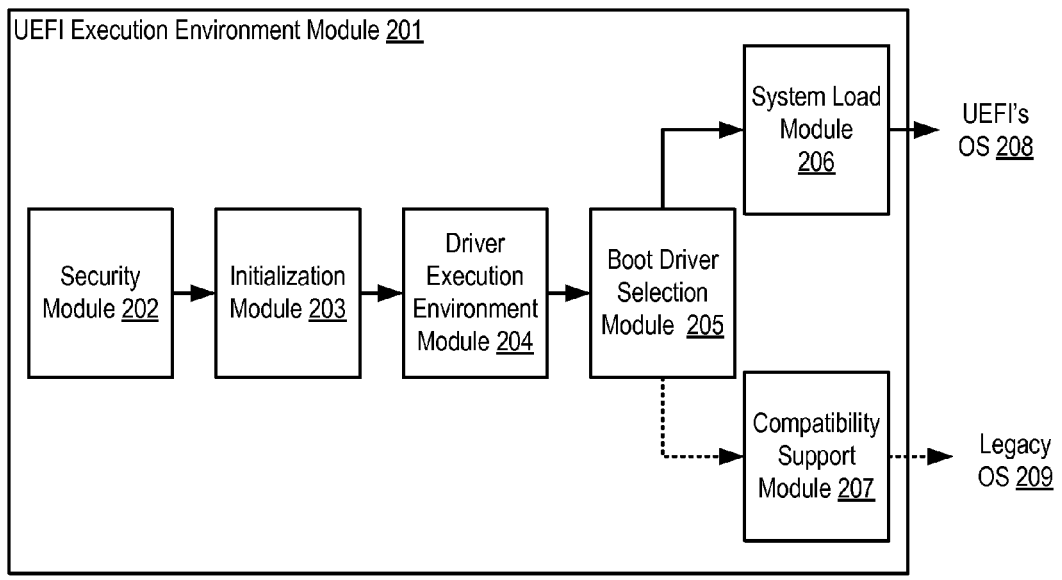
FIG. 2 shows a block diagram of an UEFI pre-boot environment according to the present invention.

With reference now to FIG. 2, a block diagram of an UEFI pre-boot environment according to the present invention, that is, a block diagram of UEFI firmware, is shown. In the description, UEFI pre-boot environment and UEFI firmware are synonym and will not be distinguished. UEFI pre-boot environment mainly includes an UEFI execution environment module 201, and this module further includes a security module 202, an initialization module 203, a driver execution environment module 204, a boot driver selection module 205 and a system load module 206 or compatibility support module 207. When the system load module of UEFI loads an OS 208 supporting and utilizing UEFI, since such OS supports some standard interfaces defined by UEFI specification, the system load module may directly return to UEFI pre-boot environment if the OS can not be successfully loaded due to any problem. When the compatibility support module of UEFI loads and boots a legacy OS 209, however, once UEFI enters into Compatibility Support Module to perform boot attempt on legacy OS, there is no way to return to UEFI pre-boot environment even if boot attempt of the legacy OS fails. As such, engineers can not conduct problem diagnosis.

Both UEFI firmware and OS are software running on CPU hardware. UEFI firmware is a segment of code running prior to OS, and is responsible for hardware initialization before OS starts up and for preparation of service interfaces available to OS. CPU system has various modes, including real mode, protected mode, virtual 8086 mode and System Management Mode, and the CPU system can be switched among various modes. CPU generally operates in real mode after it is powered on, CPU uses registers to notify CPU of location of instructions in memory; it uses DS, ES, FS, GS, SS and other registers to indicate location of data segments with different purposes in memory, so as to indicate main content needed when running a next program. The protected mode is the same as the real mode, and the essence of running a program under protected mode is still "CPU executes instruction(s) to manipulate related data". Thus, various code segments, data segments, stack segments, interrupt service program in real mode still exist, and their functions and effects remain unchanged. UEFI firmware operates in real mode after CPU is powered on, and UEFI also includes code running in CPU's protected mode and code running in CPU's System Management Mode. When UEFI enters into Compatibility Support Module to perform boot attempt on legacy OS, code of UEFI are running in CPU's protected mode. If boot attempt fails and there is a need to return to UEFI pre-boot environment, what is required is to return to CPU's protected mode first. System Management Mode is a special processor mode, which can provide some functions in system level, such as power source management, system hardware control and so on. The main benefit of System Management Mode is that, it can provide a processor environment that is entirely different from and independent to common CPU operation environment. Such environment is hard to be perceived by OS or application software. When CPU enters into System Management Mode, CPU will save a portion of CPU execution context information, such as register values of CPU, into a chunk of System Management Mode memory (SMM RAM), i.e., so called CPU Save State Region. When exiting from System Management Mode, the processor will utilize a portion of CPU execution context in processor Save State Region to restore processor state prior to entering into System Management Mode. UEFI firmware may utilize such technical feature as restore processor state prior to entering into System Management Mode when exiting from System Management Mode, to return to UEFI pre-execution environment.

For an OS supporting UEFI, since system load module is directly invoked by UEFI, the system load module will directly return to UEFI pre-execution environment if it fails. The OS will not destroy UEFI pre-boot environment context before it has been successfully loaded. However, after OS starts up successfully, there is no way to directly return to UEFI pre-boot environment.

The compatibility support module may boot a legacy OS, this is because the compatibility support module provides implementations of some interfaces required by legacy OS or legacy Option ROM originally existed in traditional BIOS in UEFI firmware, wherein Option ROM is a type of firmware that controls various boards and cards and may be placed on boards and cards or be included in UEFI firmware or BIOS firmware. However, once UEFI firmware enters into Compatibility Support Module to perform booting of legacy OS, UEFI pre-boot environment context will be destroyed. Thus, even if the attempt of booting legacy OS fails, since UEFI pre-boot environment context has been destroyed, there is no way to return to UEFI pre-boot environment.

Thus, in order to return to UEFI pre-boot environment, one thing important is to ensure integrity of UEFI pre-boot environment, that is, save necessary information in UEFI pre-boot environment context. Another thing is to utilize the above feature that CPU will restore processor state prior to entering into System Management Mode when it exits from System Management Mode.

Accordingly, the present invention provides a method and system for restoring from legacy OS environment to UEFI pre-boot environment. Within an environment supporting multi-OS, such method and system may be used to support diagnosis on boot failure of legacy OS and subsequent boot attempt of UEFI OS.

Figure 3:
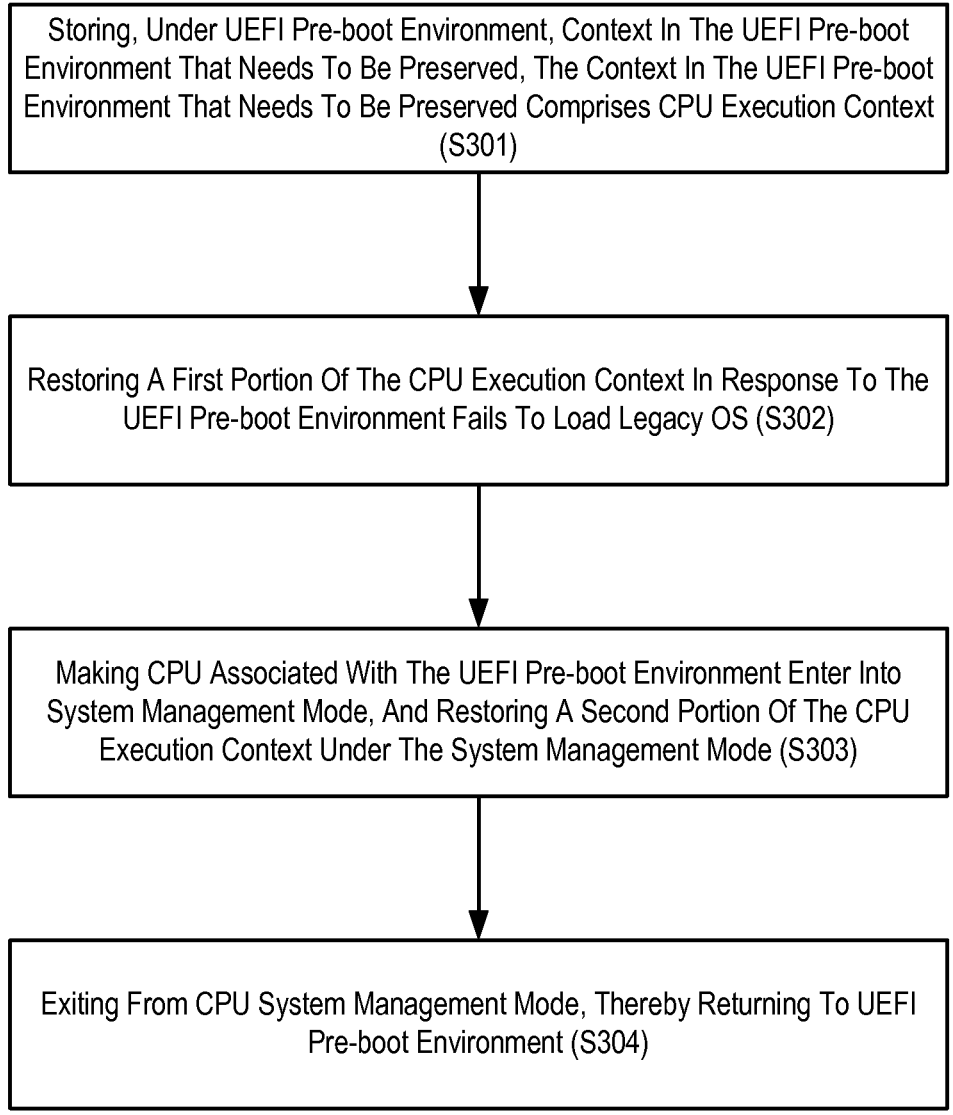
FIG. 3 shows steps of a method for restoring from legacy OS environment to UEFI pre-boot environment according to an embodiment of the present invention.

FIG. 3 shows steps of a method for restoring from legacy OS environment to UEFI pre-boot environment according to an embodiment of the present invention. According to FIG. 3, the method comprising:

In step S301, storing, under the UEFI pre-boot environment, context in the UEFI pre-boot environment that needs to be preserved, the context in the UEFI pre-boot environment that needs to be preserved comprises CPU execution context;

In step S302, restoring a first portion of the CPU execution context in response to the UEFI pre-boot environment fails to load legacy OS;

In step S303, making CPU associated with the UEFI pre-boot environment enter into System Management Mode, and restoring a second portion of the CPU execution context under the System Management Mode; and In step S304, exiting from CPU System Management Mode, thereby returning to the UEFI pre-boot environment.

The context in the UEFI pre-boot environment that needs to be preserved comprises CPU execution context. Specifically, the CPU execution context may be divided into two portions: the first portion includes Global Descriptor Table (GDT), Interrupt Descriptor Table (IDT), control register and segment register; the second portion includes flag register, instruction pointer register, general register, system management base register. Since CPU can enter into System Management Mode only after the first portion of CPU execution context has been restored; while the second portion of CPU execution context has to be restored under System Management Mode, such that CPU can utilize that CPU execution context to restore processor state prior to entering into System Management Mode when CPU exits from System Management Mode, thereby restoring to UEFI pre-boot environment.

CPU's registers are software-and-hardware interfaces by which software communicates with hardware of CPU, and register values of CPU (take 64-bit CPU for example) need to be saved and restored include: flag register (such as RFLAGS), instruction pointer register (such as RIP), general register (such as RDI, RSI, RBP, RSP, RBX, RDX, RCX, RAX, R8~R15), system management base register (SMBASE), control register (such as CR0, CR3), segment register (such as GS, FS, DS, SS, CS, ES). Registers that may be restored by modifying CPU save state region include: flag register, instruction pointer register, general register, system management base register. Segment register may be restored through MOV or POP instruction, control register may be restored through MOV instruction. Global Descriptor Table resides in memory region and stores global data structures (such as segment descriptors) therein. GDTR register points to memory region where Global Descriptor Table is stored and address of Global Descriptor Table may be loaded or saved through LGDT/SGDT instruction; Interrupt Descriptor Table resides in memory region and stores interrupt descriptors therein. IDTR register points to memory region where Global Descriptor Table is stored and address of Interrupt Descriptor Table may be loaded or saved through LIDT/SIDT instruction. Here, instruction pointer register is used to point to memory address of code currently being executed.

The above method can exit from CPU System Management Mode, thereby returning to original running environment, i.e. UEFI pre-boot environment, however, this environment is not necessary the original UEFI pre-boot environment, this is mainly because it is not known whether another part of context information used to return to original UEFI pre-boot environment has been destroyed. Thus, the context in the UEFI pre-boot environment that needs to be preserved further comprises address of a memory region where UEFI code and data reside and content of that memory region, because the address and content is environment in which UEFI originally operates, these information may enable the system to directly return to the environment in which UEFI originally operates. UEFI boot service routines defined by UEFI specification have to be provided in implementation of UEFI firmware, and GetMemorymap( ) method therein may be used to get a memory region table (memory map). The method will return an array containing memory descriptors, each of which will indicate type of corresponding memory region, start address, size, and attribute. Address of memory region needs to be preserved may be determined through start address and size in memory descriptors, thereby obtaining content of that memory region.

Figure 4:
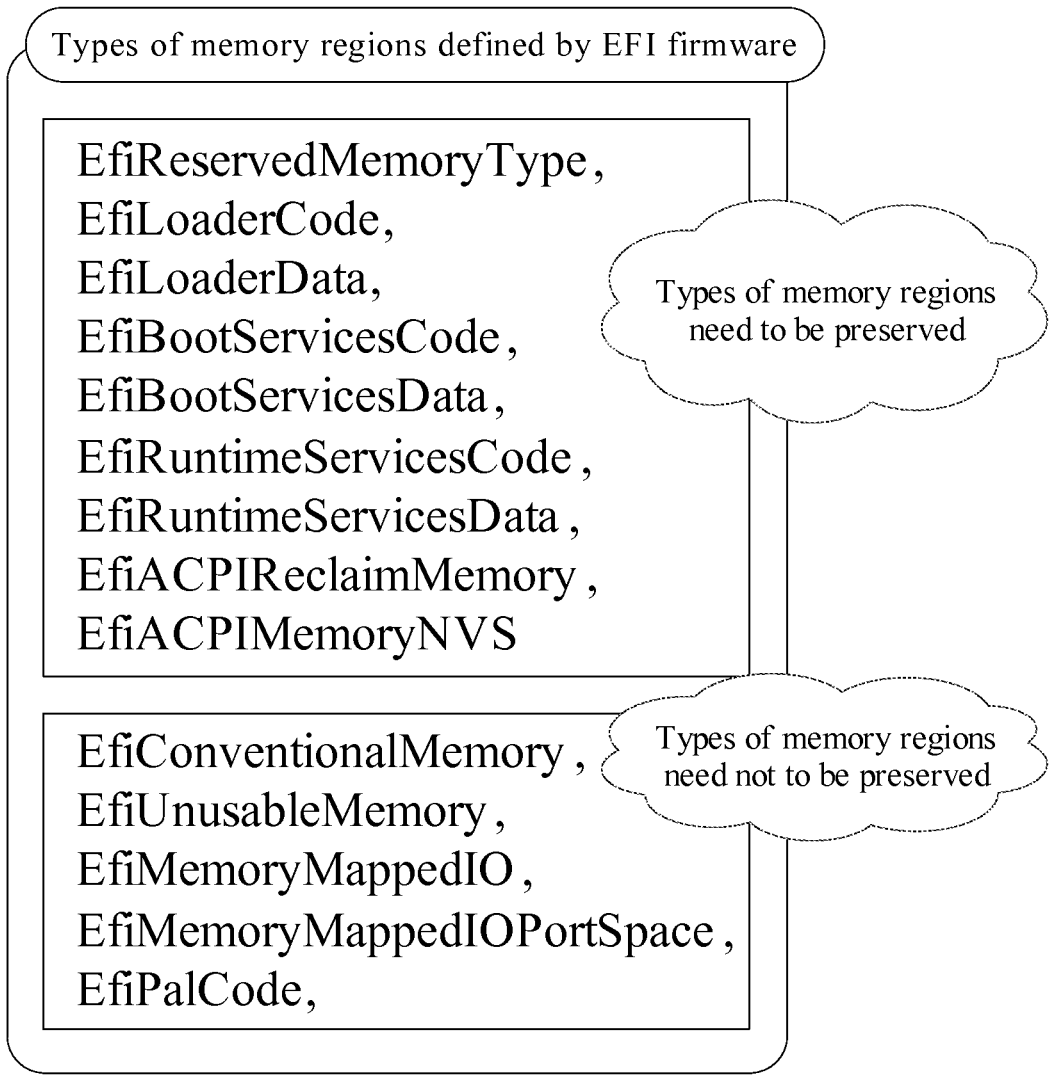
FIG. 4 shows types of memory region defined by UEFI firmware.

FIG. 4 shows the types of memory regions defined by UEFI firmware, in which, the upper half of FIG. 4 is the types of memory regions need to be preserved in UEFI pre-boot environment. Wherein, memory type descriptors are as follows:

EfiReservedMemoryType—reserved memory type, this type of memory region is protected by UEFI firmware and OS;
EfiLoaderCode, EfiLoaderData—the type of memory region for storing UEFI loader code and data;
EfiBootServicesCode, EfiBootServicesData—the type of memory region for storing code and data of boot service driver program;
EfiRuntimeServicesCode, EfiRuntimeServicesData—the type of memory region for storing code and data of runtime service driver program;
EfiConventionalMemory—the type of usable conventional memory region;
EfiUnusableMemory—the type of memory region unusable due to presence of error;
EfiACPIReclaimMemory—the type of memory region for storing advanced configuration and power interface table (ACPI Table);
EfiACPIMemoryNVS—the type of memory region reserved for use by firmware;
fiMemoryMappedIO, —the type of memory region for establishing memory mapped input output;
fiMemoryMappedIOPortSpace—the type of memory region for memory mapped input output port;
EfiPalCode—the type of memory for storing code of processor abstraction layer.

In an embodiment, in order to enable the system to directly return to original UEFI running environment, the method shown in FIG. 3 further comprises: restoring content of the memory region where UEFI code and data reside within the context in the UEFI pre-boot environment that needs to be preserved to address of the memory region where UEFI code and data reside in response to the UEFI pre-boot environment fails to load legacy OS. However, this restoration manner has the risk that memory region is concurrently accessed by OS so that integrity of UEFI pre-boot environment context is destroyed. In a further embodiment, the method further comprises: in response to the UEFI pre-boot environment fails to load legacy OS, shutting down memory mapped input output (MMIO) of PCI devices after restoring content of the memory region where UEFI code and data reside within the context in the UEFI pre-boot environment that needs to be preserved to address of the memory region where UEFI code and data reside. This may prevent access to memory by direct memory access device (DMA) from destroying the restored region, so as to reduce the risk that integrity of UEFI pre-boot environment context is destroyed. The step of shutting down may be accomplished by clearing base address register in PCI device configuration space.

In another embodiment, in order to enable the system to directly return to original UEFI running environment, the method shown in FIG. 3 further comprises: restoring content of the memory region where UEFI code and data reside within the context in the UEFI pre-boot environment that needs to be preserved to address of the memory region where UEFI code and data reside in response to the CPU enters into System Management Mode. In a further embodiment, the method further comprises: in response to CPU enters into System Management Mode, shutting down memory mapped input output (MMIO) of PCI devices after restoring content of the memory region where UEFI code and data reside within the context in the UEFI pre-boot environment that needs to be preserved to address of the memory region where UEFI code and data reside. This may prevent access to memory by direct memory access device (DMA) from destroying the restored region. The step of shutting down may be accomplished by clearing base address register in PCI device configuration space.

The context in the UEFI pre-boot environment that needs to be preserved may be saved in any proper memory region, as long as data stored in this memory region will not be destroyed in UEFI pre-boot environment and legacy OS environment. In a simple embodiment, an external storage (generally, storage medium such as USB storage medium, optical disk, movable hard disk or floppy disk, etc) may be used to store the context in the UEFI pre-boot environment that needs to be preserved. Content stored via these manners may be controlled by program and will not be destroyed by UEFI pre-boot environment and legacy OS environment. However, time required for restoration is relatively long, and process of restoration is relatively complex, for example, code that is capable of driving the devices needs to be run during restoration, and there is possibility that context content stored in external storage device may be destroyed if there is no special protection mechanism (such as placed in a hidden partition).

In another embodiment, UEFI reserved memory may be employed to store context in the UEFI pre-boot environment that needs to be preserved. The integrity of memory regions of such EFI reserved memory may be guaranteed both in UEFI pre-boot environment and legacy OS environment. The context in the UEFI pre-boot environment that needs to be preserved may be saved at any time after entering into UEFI pre-boot environment, so long as it is before UEFI enters into compatibility support module to perform invocation of booting of legacy OS. In a preferred embodiment, UEFI system service needs to be invoked first to allocate sufficient reserved memory, such that the context in the above UEFI pre-boot environment that needs to be preserved is saved in the allocated reserved memory.

In an embodiment, the method further comprises: modifying saved instruction pointer register in response to CPU enters into System Management Mode, such that the instruction pointer register points to an instruction next to an invocation instruction that conducts booting of legacy OS, so as to avoid invoking legacy OS again and returning to UEFI pre-boot environment again, thus forming a vicious circle.

In step S302, restoring a first portion of the CPU execution context in response to the UEFI pre-boot environment fails to load legacy OS, here, some embodiments about how to determine that UEFI pre-boot environment fails to load legacy OS are provided.

In an embodiment, when the compatibility support module starts loader of legacy OS, in response to boot failure, the loader of legacy OS typically will invoke a software interrupt (such as INT18) to inform UEFI firmware. From the perspective of UEFI firmware, it can be determined that UEFI pre-boot environment fails to load legacy OS in response to receive a software interrupt from the loader of legacy OS. Upon determination of failure, how to make CPU associated with UEFI pre-boot environment enter into System Management Mode may utilize an interrupt handler function, to restore a first portion of the CPU execution context and/or address of memory region where UEFI code and data reside, and content of that memory region.

In another embodiment, a watchdog clock may be added in UEFI firmware for detecting system hang state of legacy OS during boot period. The watchdog clock is preset into a specified time, the watchdog clock triggers a hardware interrupt if UEFI pre-boot environment has not received a notification that booting of legacy OS is successful within the specified time preset by the watchdog clock, and it is determined that UEFI pre-boot environment fails to load legacy OS according to triggering of the hardware interrupt. On the contrary, if UEFI pre-boot environment has successfully loaded legacy OS, UEFI pre-boot environment will receive a notification that legacy OS has been successfully booted within the specified time preset by the watchdog clock, at this point, UEFI firmware may stop the watchdog clock or preset it into an infinite period of time. In the specific embodiment, an interrupt handler function may be used to restore a first portion of the CPU execution context and/or address of memory region where UEFI code and data reside, and content of that memory region.

In still another embodiment, a Machine-Check Exception mechanism may be used. The Machine-Check Exception is a mechanism provided by CPU for detecting and reporting hardware error. It is an exception with highest priority in PC system, and cannot be broken by any other interrupt/exception. In Machine-Check Exception, for example, as to CPU with X86 architecture, status of error happened may be reported via an IA32_MCi_STATUS register, two bits therein may be used to check whether current CPU execution context has been destroyed: Valid (bit 63)=1 and PCC (bit 57)=0, it represents that context has not been destroyed. If the CPU execution context has not been destroyed, then first portion of the CPU execution context and/or address of memory region where UEFI code and data reside and content of that memory region may be restored in handler function of Machine-Check Exception. In a further embodiment, whether the CPU execution context has been destroyed needs to be judged first in exception handler function. If the CPU execution context has not been destroyed, first portion of the CPU execution context and/or address of memory region where UEFI code and data reside and content of that memory region may be restored after the error has been corrected; and if the CPU execution context has been destroyed, the only thing can do is to reboot the system.

Restoring the first portion of the CPU execution context comprises restoring Global Descriptor Table (GDT), Interrupt Descriptor Table (IDT), control register and segment register, and the following pseudo code may be used:

```
MemoryCopy (ORIGINAL_GDT_ADDRESS,
SAVED_GDT_ADDRESS, sizeof(GDT) ) // restore Global
Descriptor Table
LGDT ORIGINAL_GDT_ADDRESS
MemoryCopy (ORIGINAL_IDT_ADDRESS,
SAVED_IDT_ADDRESS, sizeof(IDT) ) // restore Interrupt
Descriptor Table
LIDT ORIGINAL_IDT_ADDRESS
MOV CONTROL_REGISTER, SAVED_CR_VALUE // restore
control register
FAR JMP ADDRESS_OF_NEXT_INSTRUCTION // far jump to
the next instruction, change execution flow and serialize
processor
MOV SEGMENT_REGISTER, // restore segment register
SAVED_SEGMENT_REGISTER_VALUE
```

To restore address of memory region where UEFI code and data reside and content of that memory region, context in the UEFI pre-boot environment that needs to be preserved may be utilized to copy content of memory region where UEFI code and data reside to the address of memory region where UEFI code and data reside. When reserved memory is employed to store context in the UEFI pre-boot environment that needs to be preserved, it is a memory-to-memory copy manner.

In step S303, making CPU associated with the UEFI pre-boot environment enter into System Management Mode, and restoring a second portion of the CPU execution context under the System Management Mode. Restoring the second portion of the CPU execution context comprises restoring flag register, instruction pointer register, general register, system management base register, and pseudo code similar to that used to restore the first portion of the CPU execution context may be used. Making CPU associated with the UEFI pre-boot environment enter into System Management Mode may use hardware trigger manner, or may use a manner of triggering software System Management Interrupt (software SMI). Before making CPU associated with UEFI pre-boot environment enter into System Management Mode, CPU is to be switched to protected mode first and then the software System Management Interrupt (software SMI) is triggered, such that the CPU can enter into System Management Mode.

In step S304, exiting from CPU System Management Mode, thereby returning to the UEFI pre-boot environment, wherein, exiting from CPU System Management Mode may be accomplished by executing a RSM instruction by CPU, thus returning to initially saved UEFI pre-boot execution environment, such that it is possible to try a next UEFI boot option or perform UEFI system diagnosis. Furthermore, since controllers in the system are all disconnected by UEFI during the attempt of booting legacy system, after UEFI pre-boot environment is restored, drivers of the controllers controlled by UEFI are made to rerun in response to returning to the UEFI pre-boot environment, such that UEFI's control on the controllers can be restored.

Figure 5:
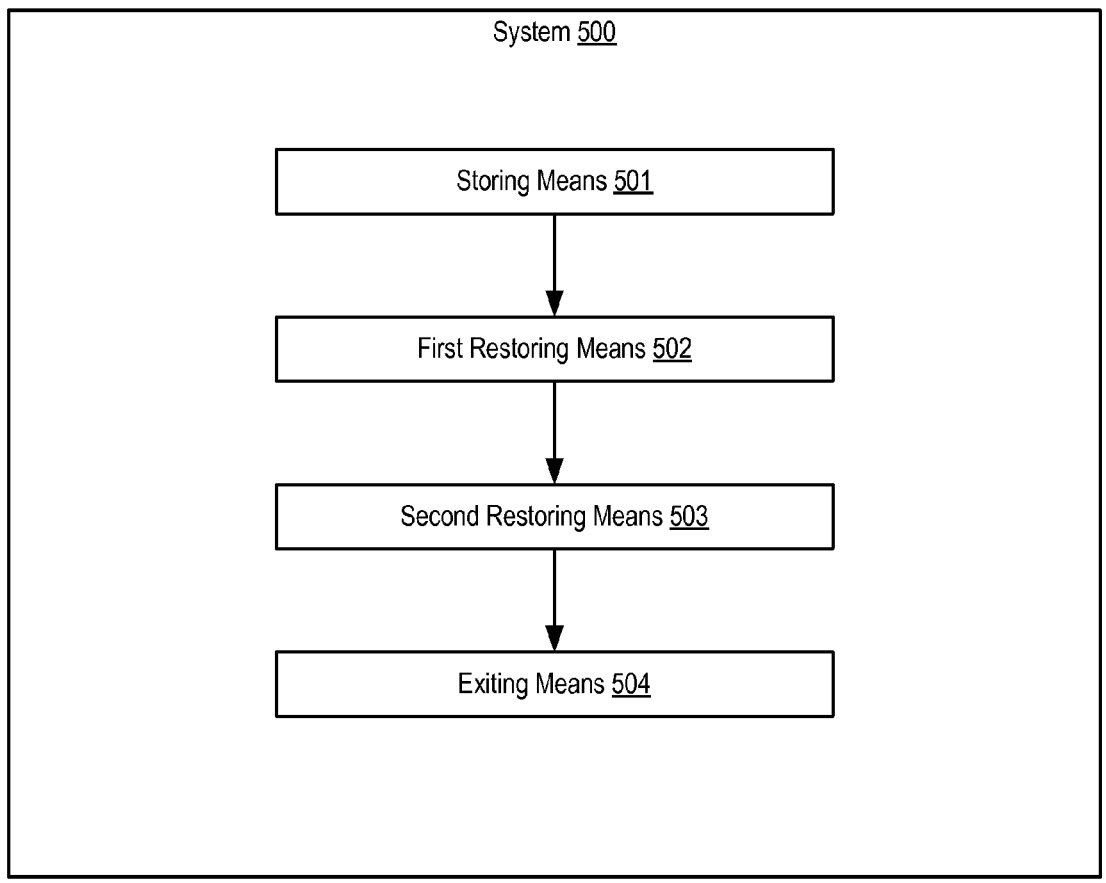
FIG. 5 shows a structural block diagram of a system for restoring from legacy OS environment to UEFI pre-boot environment.

Under a same inventive concept, the present invention also discloses a system for restoring from legacy OS environment to UEFI pre-boot environment, and FIG. 5 shows a structural block diagram of the system for restoring from legacy OS environment to UEFI pre-boot environment. According to FIG. 5, the system comprising: a storing means 501 configured to store, under the UEFI pre-boot environment, context in the UEFI pre-boot environment that needs to be preserved, the context in the UEFI pre-boot environment that needs to be preserved comprises CPU execution context; a first restoring means 502 configured to restore a first portion of the CPU execution context in response to the UEFI pre-boot environment fails to load legacy OS; a second restoring means 503 configured to make CPU associated with the UEFI pre-boot environment enter into System Management Mode, and restore a second portion of the CPU execution context under the System Management Mode; and an exiting means 504 configured to exit from CPU System Management Mode, thereby returning to the UEFI pre-boot environment.

In an embodiment, the context in the UEFI pre-boot environment that needs to be preserved further comprises address of a memory region where UEFI code and data reside and content of that memory region. Preferably, the storing means uses UEFI reserved memory to store the context in the UEFI pre-boot environment that needs to be preserved.

In an embodiment, the first restoring means determines that UEFI pre-boot environment fails to load legacy OS by using one of: a first determining means configured to determine that UEFI pre-boot environment fails to load legacy OS in response to receive a software interrupt from loader of the legacy OS; a second determining means configured to add a watchdog clock in UEFI firmware, wherein the watchdog clock triggers a hardware interrupt if UEFI pre-boot environment has not received a notification that booting of legacy OS boot is successful within a specified time preset by the watchdog clock, and determine that UEFI pre-boot environment fails to load legacy OS according to triggering of the hardware interrupt; a third determining means configured to determine that UEFI pre-boot environment fails to load legacy OS by utilizing a Machine-Check Exception mechanism.

In an embodiment, the first restoring means is further configured to restore content of the memory region where UEFI code and data reside within the context in the UEFI pre-boot environment that needs to be preserved to address of the memory region where UEFI code and data reside in response to the UEFI pre-boot environment fails to load legacy OS. Preferably, the first restoring means is further configured to shut down memory mapped input output of PCI devices after restoring content of the memory region where UEFI code and data reside within the context in the UEFI pre-boot environment that needs to be preserved to address of the memory region where UEFI code and data reside.

In another embodiment, the second restoring means is further configured to restore content of the memory region where UEFI code and data reside within the context in the UEFI pre-boot environment that needs to be preserved to address of the memory region where UEFI code and data reside in response to the CPU enters into System Management Mode. Preferably, the second restoring means is further configured to shut down memory mapped input output of PCI devices after restoring content of the memory region where UEFI code and data reside within the context in the UEFI pre-boot environment that needs to be preserved to address of the memory region where UEFI code and data reside. Preferably, the second restoring means is further configured to modify saved instruction pointer register in response to CPU enters into System Management Mode, such that the instruction pointer register points to an instruction next to an invocation instruction that conducts booting of legacy OS.

In an embodiment, the exiting means is further configured to make drivers of controllers controlled by UEFI rerun in response to returning to the UEFI pre-boot environment.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for restoring from a legacy OS environment to a Unified Extensible Firmware Interface (UEFI) pre-boot environment, comprising:
storing, under the UEFI pre-boot environment, context in the UEFI pre-boot environment that needs to be preserved, wherein the context in the UEFI pre-boot environment that needs to be preserved comprises CPU execution context;

restoring a first portion of the CPU execution context in response to the UEFI pre-boot environment failing to load the legacy OS;

making a CPU associated with the UEFI pre-boot environment enter into System Management Mode, and restoring a second portion of the CPU execution context under the System Management Mode; and exiting from CPU System Management Mode, thereby returning to the UEFI pre-boot environment.

2. The method in accordance with claim 1, wherein the context in the UEFI pre-boot environment that needs to be preserved further comprises address of a memory region where UEFI code and data reside and content of that memory region.

3. The method in accordance with claim 2, wherein in the step of storing context in the UEFI pre-boot environment that needs to be preserved, UEFI reserved memory is utilized to store the context in the UEFI pre-boot environment that needs to be preserved.

4. The method in accordance with one of claims 2, wherein UEFI pre-boot environment fails to load legacy OS is determined by one of:

determining that UEFI pre-boot environment fails to load legacy OS in response to receive a software interrupt from loader of the legacy OS;

adding a watchdog clock in UEFI firmware, wherein the watchdog clock triggers a hardware interrupt if UEFI pre-boot environment has not received a notification that booting of legacy OS boot is successful within a specified time preset by the watchdog clock, and determining that UEFI pre-boot environment fails to load legacy OS according to triggering of the hardware interrupt; and determining that UEFI pre-boot environment fails to load legacy OS by utilizing a Machine-Check Exception mechanism.

5. The method in accordance with claim 4, wherein, further comprising:

restoring content of the memory region where UEFI code and data reside within the context in the UEFI pre-boot environment that needs to be preserved to address of the memory region where UEFI code and data reside in response to the UEFI pre-boot environment fails to load legacy OS.

6. The method in accordance with claim 5, wherein, further comprising:

shutting down memory mapped input output of PCI devices after restoring content of the memory region where UEFI code and data reside within the context in the UEFI pre-boot environment that needs to be preserved to address of the memory region where UEFI code and data reside.

7. The method in accordance with claim 4, wherein, further comprising:

restoring content of the memory region where UEFI code and data reside within the context in the UEFI pre-boot environment that needs to be preserved to address of the memory region where UEFI code and data reside in response to the CPU enters into System Management Mode.

8. The method in accordance with claim 7, wherein, further comprising:

shutting down memory mapped input output of PCI devices after restoring content of the memory region where UEFI code and data reside within the context in the UEFI pre-boot environment that needs to be preserved to address of the memory region where UEFI code and data reside.

9. The method in accordance with claim 5, further comprising:

modifying saved instruction pointer register in response to CPU enters into System Management Mode, such that the instruction pointer register points to an instruction next to an invocation instruction that conducts booting of legacy OS.

10. The method in accordance with claim 5, further comprising:

making drivers of controllers controlled by UEFI rerun in response to returning to the UEFI pre-boot environment.

11. A system for restoring from a legacy OS environment to a Unified Extensible Firmware Interface (UEFI) pre-boot environment, comprising:

a storing means configured to store, under the UEFI pre-boot environment, context in the UEFI pre-boot environment that needs to be preserved, wherein the context in the UEFI pre-boot environment that needs to be preserved comprises CPU execution context;

a first restoring means configured to restore a first portion of the CPU execution context in response to the UEFI pre-boot environment failing to load the legacy OS;

a second restoring means configured to make a CPU associated with the UEFI pre-boot environment enter into System Management Mode, and restore a second portion of the CPU execution context under the System Management Mode; and an exiting means configured to exit from CPU System Management Mode, thereby returning to the UEFI pre-boot environment.

12. The system in accordance with claim 11, wherein the context in the UEFI pre-boot environment that needs to be preserved further comprises address of a memory region where UEFI code and data reside and content of that memory region.

13. The system in accordance with claim 12, wherein in the storing means, UEFI reserved memory is utilized to store the context in the UEFI pre-boot environment that needs to be preserved.

14. The system in accordance with one of claims 12, wherein the first restoring means determines that UEFI pre-boot environment fails to load legacy OS by using one of:

a first determining means configured to determine that UEFI pre-boot environment fails to load legacy OS in response to receive a software interrupt from loader of the legacy OS;

a second determining means configured to add a watchdog clock in UEFI firmware, wherein the watchdog clock triggers a hardware interrupt if UEFI pre-boot environment has not received a notification that booting of legacy OS boot is successful within a specified time preset by the watchdog clock, and determine that UEFI pre-boot environment fails to load legacy OS according to triggering of the hardware interrupt; and a third determining means configured to determine that UEFI pre-boot environment fails to load legacy OS by utilizing a Machine-Check Exception mechanism.

15. The system in accordance with claim 14, wherein the first restoring means is further configured to restore content of the memory region where UEFI code and data reside within the context in the UEFI pre-boot environment that needs to be preserved to address of the memory region where UEFI code and data reside in response to the UEFI pre-boot environment fails to load legacy OS.

16. The system in accordance with claim 15, wherein the first restoring means is further configured to shut down memory mapped input output of PCI devices after restoring content of the memory region where UEFI code and data reside within the context in the UEFI pre-boot environment that needs to be preserved to address of the memory region where UEFI code and data reside.

17. The system in accordance with claim 14, wherein the second restoring means is further configured to restore content of the memory region where UEFI code and data reside within the context in the UEFI pre-boot environment that needs to be preserved to address of the memory region where UEFI code and data reside in response to the CPU enters into System Management Mode.

18. The system in accordance with claim 17, wherein the second restoring means is further configured to shut down memory mapped input output of PCI devices after restoring content of the memory region where UEFI code and data reside within the context in the UEFI pre-boot environment that needs to be preserved to address of the memory region where UEFI code and data reside.

19. The system in accordance with claim 15, wherein the second restoring means is further configured to modify saved instruction pointer register in response to CPU enters into System Management Mode, such that the instruction pointer register points to an instruction next to an invocation instruction that conducts booting of legacy OS.

20. The system in accordance with claim 15, wherein the exiting means is further configured to make drivers of controllers controlled by UEFI rerun in response to returning to the UEFI pre-boot environment.

* * * * *